US005796110A

United States Patent [19]

An et al.

[11] Patent Number: 5,796,110

[45] Date of Patent: Aug. 18, 1998

[54] GAS IONIZATION ARRAY DETECTORS FOR RADIOGRAPHY

[75] Inventors: Jigang An; Haifeng Wu, both of Beijing, China

[73] Assignee: Tsinghua University, Beijing, China

[21] Appl. No.: 525,580

[22] PCT Filed: Jan. 31, 1994

[86] PCT No.: PCT/CN94/00008

§ 371 Date: Sep. 18, 1995

§ 102(e) Date: Sep. 18, 1995

[87] PCT Pub. No.: WO94/22163

PCT Pub. Date: Sep. 29, 1994

[30] Foreign Application Priority Data

Mar. 18, 1993 [CN] China ................................ 93102728.4

[51] Int. Cl.$^{6}$ ................................ G01T 1/185

[52] U.S. Cl. ................................ 250/385.1; 250/340.02

[58] Field of Search ................................ 250/385.1, 390.02; 378/57

[56] References Cited

U.S. PATENT DOCUMENTS

| | | | |
|---|---|---|---|
| 4,394,578 | 7/1983 | Houston et al. | 250/385.1 |
| 4,583,020 | 4/1986 | Cliquet et al. | 250/385.1 |
| 5,025,376 | 6/1991 | Bova et al. | 250/385.1 |

FOREIGN PATENT DOCUMENTS

| | | | |
|---|---|---|---|
| 78042 | 4/1986 | Japan | 250/385.1 |

*Primary Examiner*—Michael J. Tokar
*Assistant Examiner*—Richard Hanig
*Attorney, Agent, or Firm*—Ladas & Parry

[57] ABSTRACT

The present invention provides a device of gas array detectors for high energy X or γ-rays radiography. This device comprises a plurality of gas-pressurized array ion-chamber units mounted on a frame. Each of the gas-pressurized array ion-chamber units is constituted by pressure proof case (1,5), window (2), strap electrodes system (3), electrodes system support (4) and high pressure gas filled therein. The output signals of the detectors depend on the ionizing effect caused by the secondary electrons produced by the interactions of the X, γ-rays and the high pressure gas.

10 Claims, 4 Drawing Sheets

GAS IONIZATION ARRAY DETECTORS FOR RADIOGRAPHY

FIELD OF THE INVENTION

The present invention relates to a device of gas ionization array detectors for high energy X or γ-ray radiography which pertains to the area of nuclear technical applications.

BACKGROUND OF THE INVENTION

In the known prior art, China Patent No. 86,108,035 disclosed a device of gas discharge array detectors which primarily utilizes secondary electrons generated by the interaction of a solid state plate converter made of high atomic number material (e.g. Ta) and at a small approach angle (1° or less) to the incident X or γ photons with the rays to cause gas discharge to output a signal. Such device of detectors employs thin anode wires arranged in an array to obtain X or γ-ray intensity signals at different positions. Each (or each pair) of the anode wires forms a pixel, the discharge signal of which represents the X or γ-ray intensity at its position. The working gas is usually supplied by gas-flow system, keeping the pressure around one atmosphere. This patent also mentioned that it is also possible to use working gas of pressure less than $10^6$ pascals and placed in a sealed case, such as to eliminate the gas-flow systems. However, gas-flow systems supplied by steel gas bottles are still used in actual products. The container inspecting system ("Sycoscan" system) using such device of array detectors manufactured by the Schlumberger Inc. has been marketed.

The dynamic range of the signals of such detecting device is large ($10^5$), as well as their detecting efficiency and sensitivity are high, satisfying the basic requirements of detecting systems. However, the following drawbacks still exist therein:

(1) The secondary electrons generated by the incident X or γ-photons can not be prevented from passing through between the pixels due to only gas existing between the pixels constituted by the respective anode wires and without any other isolators. Thus, the X or γ photon incident upon any one of the pixels not only causes the respective pixel but also its neighboring pixels to output signals. Therefore, the output signal of each (or each pair) of the anode wires not only reflects the incident of X or γ-ray intensity on the spot, but also reflects the influences of the X or γ rays incident upon other positions, this will make the image "fuzzy". In order to overcome this disadvantageous factor, special computer software and high speed hardware system must be configured to carry out large amount of anti-convolution calculation processing, this significantly increases the difficulty of image processing, and hence the cost.

(2) Each of anode wires is very thin (tens of μm), and has a length of 200–300 mm, thereby noise can be easily produced due to vibration.

(3) The gas-flow working mode currently used needs to configure a gas supply system with bulky pressurized steel gas bottle. In addition, the steel gas bottle should be renewed every period of time (for example every three months).

(4) Gas discharging requires a working voltage of several thousands volts which should be well regulated. Otherwise, it will result in the fluctuation of the gas amplification ratio.

(5) The multi-atom molecule gases (e.g. $CH_4$) that should be mixed into the working gas may be decomposed during gas discharge and produce sediments. Furthermore, the discharging process itself may damage the surface of the anode wires, therefore, the life of such detecting device is rather short.

SUMMARY OF THE INVENTION

It is therefore an object of the present invention to provide an improved device of gas ionization array detectors for high energy X or γ-ray radiography, which utilizes the ionization effect of the secondary electrons generated by the interaction of the high energy X or γ-ray with the special pressurized high atomic number working gas to output signals, achieving the aims of imaging detection. This detecting device primarily makes use of the drift motions of the ions and electrons under the effect of electrical field to output signals, without the use of any gas discharge mechanism, wherein the ions and electrons are generated by the ionization of the secondary electrons generated by the interaction of the X or γ-ray mainly with the high pressure working gas medium.

The present invention is contemplated and developed aiming at a radiation source of X or γ photon energy up to 20 Mev, this is different from the devices of array detectors for the X-γ ray source with maximum energy less than 150 Kev and the radio-active isotope source with energy less than 150 Kev in medical diagnosis field. For distinguishing, X-ray with maximum energy higher than 150 Kev and γ-rays with energy higher than 150 Kev are referred to as "high energy X or γ radiation (ray)" throughout the specification of the present invention.

The contents of the present invention involve a device of gas ionization array detectors for high energy X or γ ray radiography, comprising a plurality of gas-pressurized array ion-chamber units mounted on a frame. Each of the ion-chamber unites comprises a pressurized case, a window, a strap electrode system, an electrode system support, and pressurized gas filled therein. The window is formed in the front portion of the sealed case, the strap electrode system is supported by the support and comprises a plurality of sets pixel ion-chamber elements each constituted by a high voltage electrode and a collecting electrode, the strap electrode of each of the pixel ion-chamber element is substantially parallel to the traveling direction of the X or γ-ray incident upon that pixel.

DETAILED DESCRIPTION OF PREFERRED EMBODIMENTS

Figure 1:
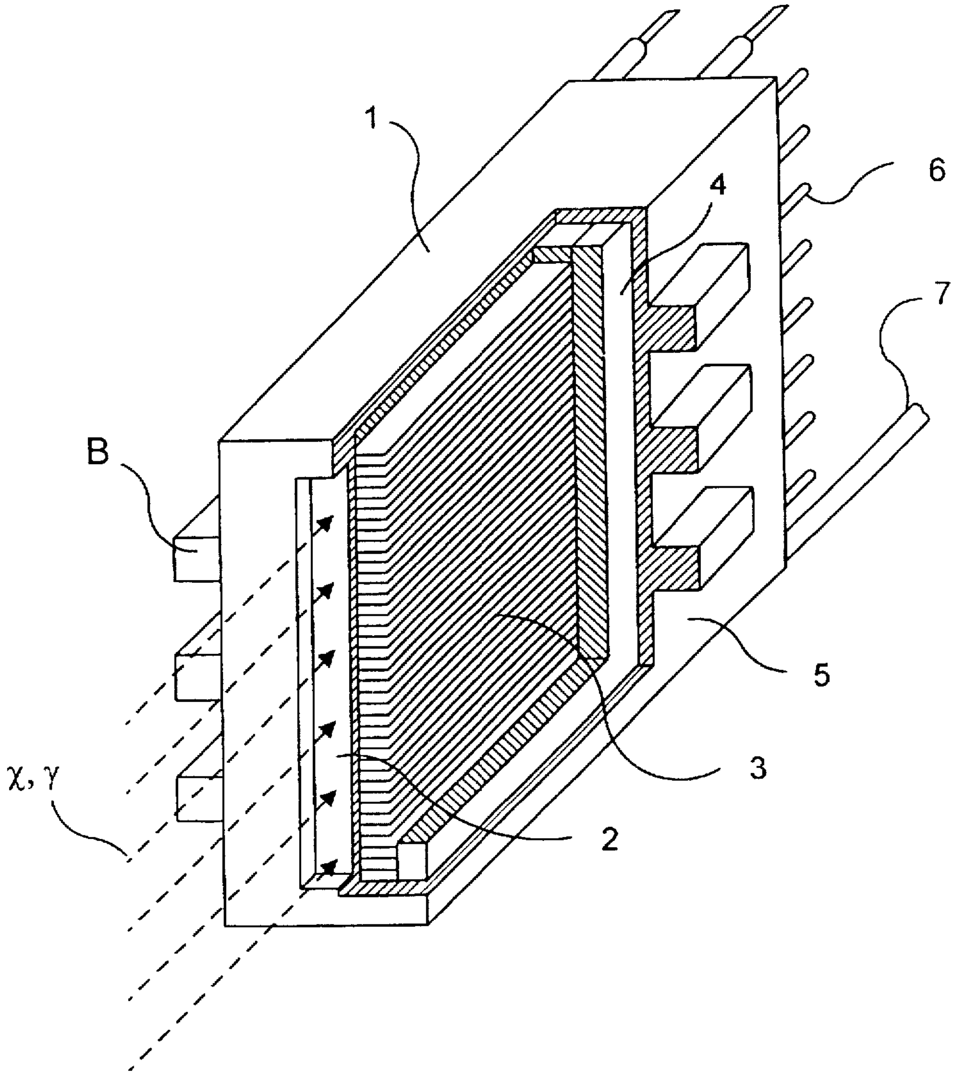
FIG. 1 is a schematic structural diagram of an ion-chamber unit constituting the device of the present invention.
Figure 6:
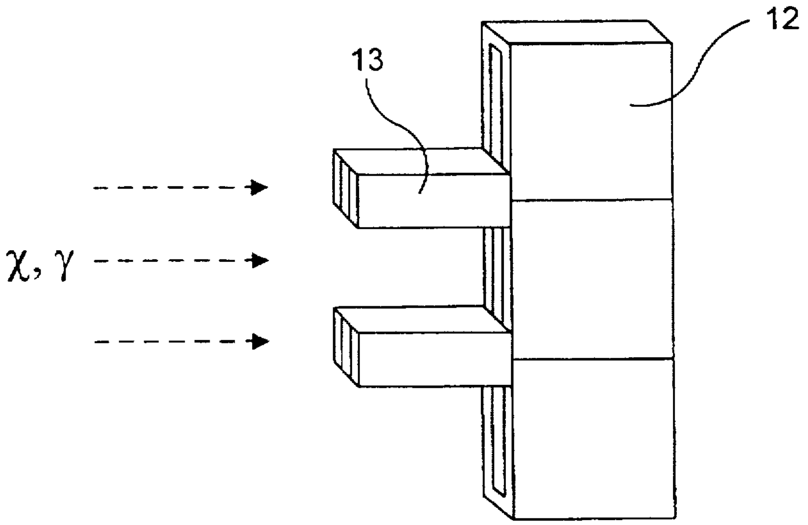
FIG. 6 shows the pattern of arrangement of the ion-chamber units.
Figure 7:
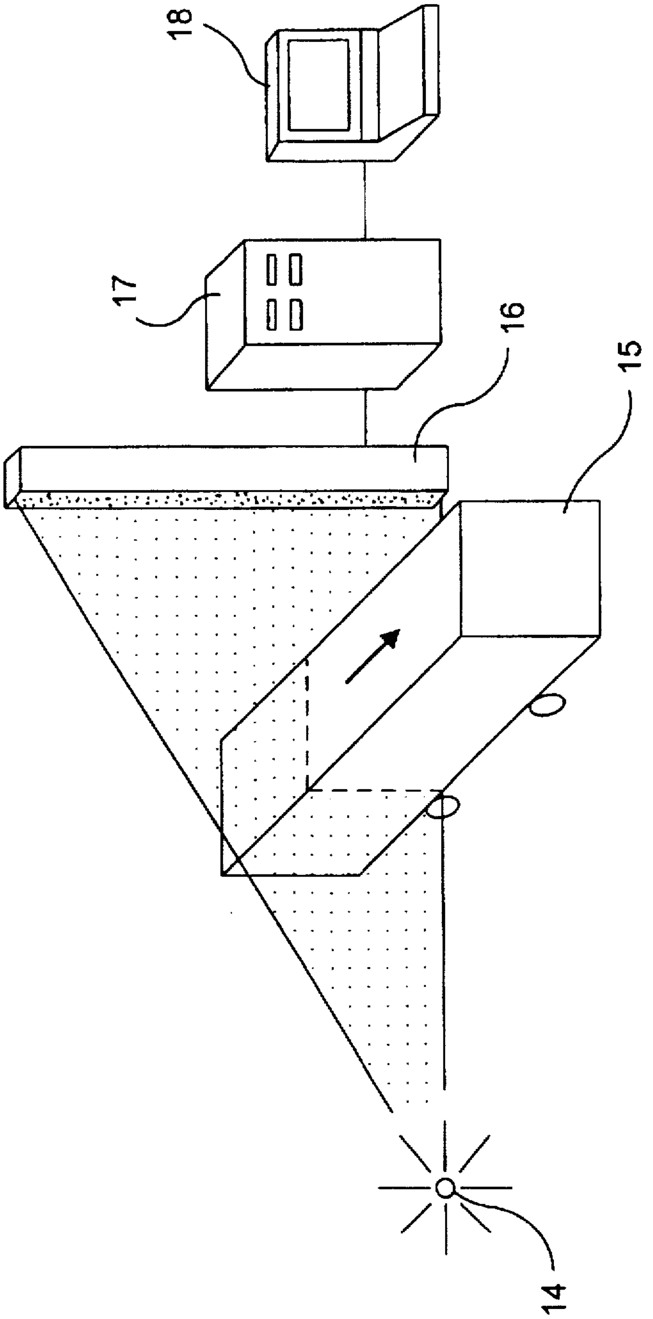
FIG. 7 is a schematic perspective diagram of an application system of the present invention.

The contents of the present invention will be described in detail with reference to the accompanying drawings. In FIG. 1, 1 indicates the cover of the sealed case of an array ion-chamber unit, 2 indicates a window, 3 the electrode system, 4 the electrode system support, 5 a side wall if the case, 6 ceramic-to-metal sealed insulators, 7 gas outlet, 8 re-enforced ribs; in FIGS. 2–5B, 9 indicates insulating spacers, 10 the high voltage electrode, 11 the collecting electrode; in FIG. 6, 12 indicates a standard array ion-chamber unit, 13 an auxiliary array ion-chamber unit; In FIG. 7, 14 indicates the radiation source, 15 an object to be inspected, 16 indicates a device of array detectors for radiography according to the present invention, 17 a signal processing system, and 18 a display terminal.

As mentioned above, the present invention relates to a device of array detectors which directly makes use of the ionization effect of the secondary electrons generated by the interaction of the high energy X or γ-ray with special pressurized high atomic number working gas to output signals, this device comprises a plurality of pressurized gas array ion-chamber units mounted on a special frame behind a collimator. Each of the array ion-chamber units comprises a pressurized case 1, an electrode system constituted by a plurality of strap electrodes and pressurized high atomic number working gas filled therein. Each set of high voltage electrode (either positive or negative high voltage can be applied thereto) and collecting electrode (signal output electrode) constitutes a pixel ion-chamber element, the output signal thereof reflects the intensity of the X or γ-ray on that place, constituting a "pixel" in the radiograph. The cross-sectional area of a pixel ion-chamber element is that of a pixel. Each electrodes system unit comprises a certain number of pixel ion-chamber elements (e.g. 16, 32, 64, . . . ), the strap electrode of each of the pixel ion-chamber elements is substantially parallel to the traveling direction of the X or γ-ray incident upon that pixel ion-chamber element. The incident X or γ-rays will travel in the working gas medium between the electrodes for a distance equal to the length d of the electrode. The incident X or γ photons interact with the molecules of the working gas in this distance to generate secondary electrons and cause gas ionization. The large amount of positive ions and electrons generated by ionization will drift under the effect of the electrical field between the electrodes and produce output current signals. The voltage applied across the electrodes (ion-chamber working voltage) should be less than the voltage value that may cause any gas discharging therein (Thomson avalanche discharging).

It can be seen from the Figure that the detection of the X or γ photons mainly depends on their interaction with the inter-electrode working gas. The detection efficiency of the high energy X or γ-ray can be enhanced by filling pressurized (with pressure P between $1\times10^6$ to $1\times10^7$ pascals) high atomic number gases (Ar, Kr, Xe and etc. or mixtures with those gases as main components) using high pressure sealing techniques, and by selecting the electrode length d long enough such that the product (Pd) exceeds $2\times10^5$ pascal-meters. For example, if Xe gas of pressure $5\times10^6$ pascals and electrode length d=20 cm are selected, the detection efficiency with respect to the $^{60}$Co γ-ray can reach near 30% only depending on the interaction of the molecules of Xe gas, in further consideration of the interactions with respect to the X or γ-ray of the front window and the chamber walls, the detection efficiency with respect to $^{60}$Co γ of such detecting device may exceed 30%. In addition, although the inter-electrode distance is small (e.g. 2 mm) , the signal sensitivity of the detecting device can still be very high, because large amount of ion-electron pairs can be generated in the gas between the electrodes by the secondary electrons of the X or γ photons due to large gas density and high atomic number as well as the forward rushing and scattering of the secondary electrons.

If the working gas is replaced with gases of large reaction cross-section with respect to slow neutrons, such as $^3$He and $BF_3$, then the present invention can be used in a slow neutron radiographic system. If the working gas is replaced with hydrogen containing gases such as $H_2$ or $CH_4$, then the present invention can be used in a quick neutron radiographic system.

In order to realize high pressure and ensure leak-proofness, the case of the array ion-chamber unit must be pressure-tight and of extremely good confinement. Its pressure-tight capability should exceed 1.5 times of the actual pressure of the gas filled therein. For the above-mentioned filling gas of $5\times10^6$ pascals, the pressure-tight capability of the case should achieve $8\times10^{-9}$ pascals. The total leakage rate of the sealed case should be less than 1×10 torr liter/sec, and this should be ensured by the repeating inspecting of helium mass spectrographic leak detector. The working life of the array ion-chamber unit can be ensured to be longer than 10 years by doing so.

The ion-chamber unit case can be fabricated by welding of stainless steel, carbonsteel or other metal plates (argon arc welding, plasma welding or electron-beam welding, etc.). An elongated window 2 is provided in the front portion of the case in alignment with the electrode system. The width of the "window" is equal to or slightly greater than the pixel width required, and the mass thickness of which is 0.1–0.3 grams/cm$^2$, thus the absorption loss of the incident X or γ photons beam passing through the "window" can be reduced. A certain number of ceramic-to-metal sealed insulators more than the pixel ion-chamber elements are welded onto the case using braze welding or argon arc welding, for leading out the output signals of each of the pixel ion-chamber element collecting electrode and leading in the external high voltage. The ceramic elements used are aluminum oxide ceramics of purity higher than 95%, or even artificial jewels ($Al_2O_3$ monocrystal). The insulating resistance of the insulators after sealing should be greater than $1\times10^{12}$ Ω, and their leakage rate should be less than $1\times10^{-10}$ torr. liter/sec.. In order to improve the pressure proof intensity of the case, several re-enforced ribs 8 may be welded onto the side wall of the case to prevent the case from deformation during gas filling.

The strap electrode plate is made of metals Al, Fe, Ni, Cu, Mo, W, Ta, Nb and etc. or their alloys, the mass thickness should be equal to or greater than 0.1 g/cm$^2$, for preventing the secondary electrons generated by the X or photons from penetrating the electrode plate and "breaking into" other neighboring pixel ion-chambers. The drawbacks of the "penetrating" or "breaking into" of the secondary electrons on the above-mentioned gas discharge array detecting device can be avoided basically by doing so, it is very advantageous in enhancing the quality of images.

Figure 2:
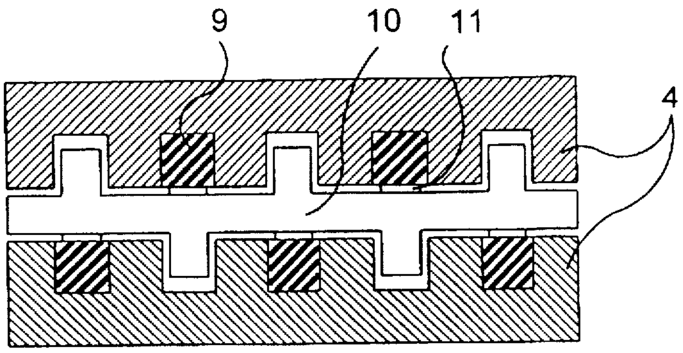
FIG. 2 of a schematic diagram of the electrode system support structure.

In order to eliminate the influence of leaked current and allow the pressurized array ion-chamber to work both in the pulse mode and in the average D.C. mode, a special supporting structure for the high voltage electrode and the collecting electrode as shown in FIG. 2 is specifically designed in the present invention. In this structure, no insulating material is directly connected between the high voltage electrode 10 and the collecting electrode 11. They are respectively fixed to the grounded support 4 of the electrode system through strap insulating spacers 9. A high potential difference exists on the insulating spacers supporting the high voltage electrodes, however the leaked current generated is directly led to the ground of the instrument via the grounded support, without passing through the load resistor in the output loop of the collecting electrodes and affecting the output signals. All of the collecting electrodes are supported on the same insulating spacers, however, there is no problem of current leakage for they being at similar potential.

Figure 3:
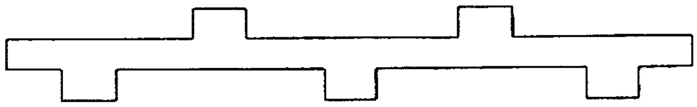
FIG. 3 shows the shape of an electrode plate.
Figure 4:
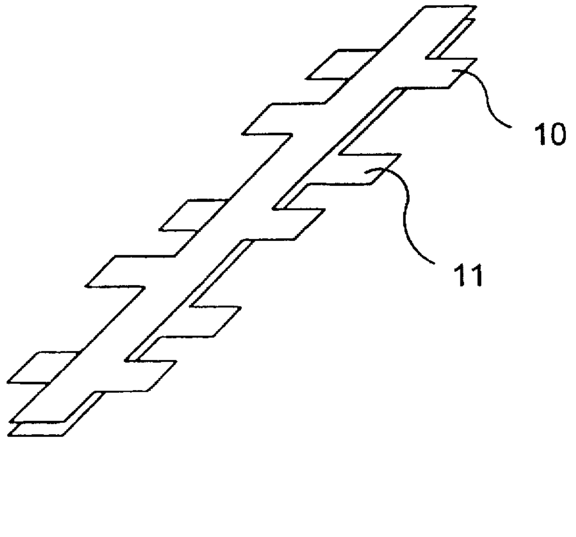
FIG. 4 shows the overlapping pattern of electrodes.

Since the number of electrode plates is very large, the high voltage electrodes and the collecting electrodes are designed to have the same shape as shown in FIG. 3 for the convenience of punching fabrication. Different numbers of projections are provided on the upper and lower sides of the electrode plate to be inserted or clamped into the strap insulating spacers. During mounting, either a high voltage electrode or a collecting electrode can be formed by interchanging the upper and lower sides of the electrode plate. All of the high voltage electrodes are mounted in the same insulating spacer slots, all of the collecting electrodes are mounted in other insulating spacer slots, all of the insulating spacers are isolated from each other by a grounded electrode support. Since all the high voltage electrodes are powered by a common supply, they can be connected with each other using a metal washer or conductor.

If the pressurized array ion-chambers only work in the pulse mode, and the requirement of signal-to-noise ratio is not high, the collecting electrodes and the high voltage electrodes can then be mounted on the same insulating spacers, without avoiding the influence of leaked current.

During the inspection of a large target (e.g. a container), the array detecting device must be far apart from the radiation source (e.g. electron linear accelerator) by a distance (e.g. 10 meter or more), to prevent the directional non-uniformity of the intensity of radiation in the field of radiation from being too serious. Then, each of the pixel ion-chamber elements in the array ion-chamber unit can be arranged parallelly in the average direction of radiation. The total opening angle of each of the array ion-chamber unit with respect to the radiation source should not exceed 2°, to prevent the differentiation of detection efficiencies caused by the differences of the angles between each of the pixel ion-chamber elements and the incident X or γ photons from being too large. In other words, the radiation source emits radiation at an angle of incidence not greater than two (2) degrees with a longitudinal axis between and parallel to any of the strap electrode plates. The number of pixel ion-chamber elements within each of the array ion-chamber units is determined by this expansion angle and the required pixel height. A whole detecting device is formed by a plurality of array ion-chamber units arranged in a sector, with the central axis of each of the units pointing at the radiation source.

Where the inspected target is relatively small, the distance from the array detecting device to the radiation source is short, the electrode system inside the array ion-chamber unit is distributed over a sector, with each of the electrodes pointing at the centre of the sector, i.e. the radiation source. In the meanwhile, the expansion angle of the array ion-chamber unit with respect to the ray source can be rather large, wherein the number of pixels mainly depends on technological conditions. The whole array device may be formed by only a single or a few number of array ion-chamber units.

Figure 5A:
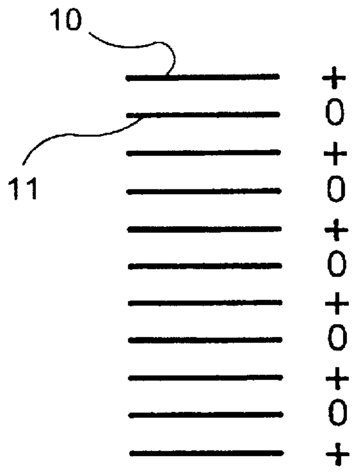
FIGS. 5A and 5B show the sorting pattern of electrodes.
Figure 5B:
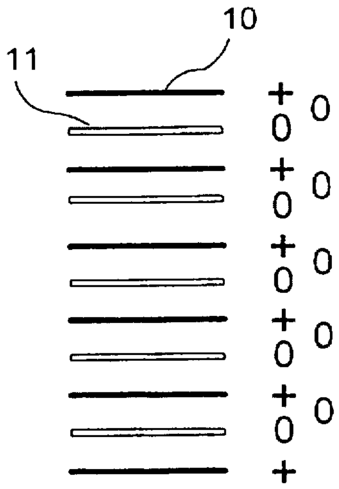

There are two arrangement sequences of the high voltage electrodes and the collecting electrodes in the electrode system of the collecting electrodes in the electrode system of the present invention, as shown in FIGS. 5A and 5B. One of them is that shown in FIG. 5A, wherein the high voltage electrodes (denoted by "+" in the figure, either positive high voltage or negative high voltage may be applied thereto in use) interleave with the collecting electrodes. The structure of this arrangement is simple, and both of the high voltage electrode and the collecting electrode can be made of the same metallic material. However, two high voltage electrode surfaces are required to be formed one pixel ion-chamber element with a collecting electrode included therein. Thus, the height of each pixel within the array ion-chamber will be greater than twice the inter-electrode distance, which is relatively suitable for the situation where the size of a pixel is relatively large (e.g. 5 mm). The other arrangement of the electrodes is shown in FIG. 5B. A pixel ion-chamber element is formed by one high voltage electrode surface and one opposite collecting electrode, another collecting electrode closely adjacent to th is collecting electrode but isolated from each other with a thin layer of insulating material forms another pixel ion-chamber element with a further opposite high voltage electrode surface. Where the height of each pixel within the array ion-chamber unit is substantially equal to the inter-electrode distance, which is suitable for the situation that the pixel size is required to be small (e.g. less than 2 mm). However, the collecting electrode therein is different from the high voltage electrode and should be specifically fabricated. According to the present invention, the collecting electrode is prepared by methods of clamping a layer of radiation-proof plastic film (such as polyimide membrane) between two thin metal plates and of coating metallized layers on the surfaces of ceramic or other insulating materials.

During inspection of large target such as container, the array detecting device may be constituted by combining a plurality of array ion-chamber units. Because the thickness of the case of the pressurized array ion-chamber element is relatively large and the support of the internal electrode system also occupies a portion of the space, the total height of the whole sensitive area will thus be less than that of the case of the ion-chamber by a certain value (such as, several tens of mm). If the whole array detecting device is formed by arranging each of the array ion-chamber units one by one along the field of radiation, then a "dead area" must have been present on the boundary of two adjacent array ion-chamber units, the X or γ photons incident in this "dead area" will not generate any signal. The present invention proposes a combining scheme as shown in FIG. 6. Each of the array ion-chamber units is still arranged by overlapping one by one. The central axis of each unit is arranged to be in alignment with the radiation source, such that their inclination angles are different from each other. Then, a set of auxiliary array ion-chamber units 13 are provided in front of this set of arranged standard ion-chamber units 12 and in the direction corresponding to the "dead area". The height of these units is small (only equal to the height of the "dead area"), and only a few number of pixel ion-chamber elements are included in each of the units, the upper and lower chamber walls thereof can thus be relatively thin, and the difference between the heights of the sensitive area and its shape becomes very small. This set of auxiliary ion-chamber units are utilized by the present invention for providing the distribution information of the X or γ intensity at the position of the original "dead area". Nevertheless, there should be a certain thickness of the upper and lower walls of the auxiliary ion-chamber, therefore, there must be an area wherein the information is lost, however, if the dimension of this area is less than the height of a pixel, it will not affect the accuracy of detection, and this can easily be achieved. It is preferable to lead out the electrode terminals of these auxiliary ion-chamber units from the side walls, in order to protect the sensitive area of the main array ion-chamber units from interference.

The pressure-resistance of the sealed case of a typical pressurized array ion-chamber unit manufactured according to the present invention is $8\times10^6$ pascals, 32 pixel ion-chamber elements therein are composed of 65 electrodes arranged according to the scheme of FIG. 5A. The inter-electrode distance in 2 mm, the thickness of electrode plate is 0.5 mm, so the height of a pixel is 5 mm, and its width is also 5 mm. The length of the electrode plate is 20 cm, it can be made of metals such as Al, Fe, Ni, Cu, Mo, W, Ta, Nb and etc. or their alloys. The leads from every collecting electrode pass through the ceramic-to-metal sealed insulators, the insulating resistance of which is higher than $10^{12}$ Ω, and the gas leakage rate lower than $1\times10^{-10}$ torr liter/sec. The internal working gas is a mixture of Xe of a pressure of $5\times10^{6}$ pascals. The electrode system employs the structure of FIG. 4 to eliminate the influence of leaked current.

Under the application of the high energy X ray generated by an electron linear accelerator (4–5 Mev), the detection efficiency of the ion-chamber unit described above may attain 30% or more, the signal sensitivity is higher than $3\times10^{5}$ electronic, charge/μGy. In consideration of working in a container (or large target) inspection system, when an electron linear accelerator is used as the bremsstrahlen radiation source, the radiation of each X ray pulse at the location of the detecting device in idle state is several hundreds of μGys. Therefore, the signal pulse charge of the detecting device in idle state will attain about $1\times10^{8}$ electronic charges, which is the pulse amplitude level of the G-M counter signals, this is very advantageous for information and image processing.

As the inter-electrode distance is only 2 mm, the response time of signals in still very rapid, with the order of magnitude of $10^{-7}$ sec, even when the working voltage is not very high. This is advantageous for improving the data acquisition speed.

The present invention is firstly developed and created for the radiographic inspection of large target such as containers, cars and trains. However, the present invention is also applicable in many other applications where relatively high energy X or γ radiography is required. For example, it can be used in the radiographic non-distruction detecting device for industrial parts or products (translational scanning imaging device or industrial CT).

When the X or γ-ray are collimated into a plurality of strip-like radiation fields by a multi-slit collimator, the speed of scanning and imaging can be improved significantly after a plurality of array detecting devices are provided, even two-dimensional radiographic projection image can be obtained directly, or it can be used to obtain the three-dimensional space distribution information associated with the target.

I claim:

1. A device of gas ionization array detectors for high energy X or γ-ray radiography for inspecting large objections, which is constituted by a plurality of ion-chamber units wherein each ion-chamber unit comprises a case, pressurized gas and an electrode system constituted by a plurality of strap electrodes, and the object is inspected by causing the gas to be ionized to generate output signals; the said a plurality ion-chamber units are pressurized gas array ion-chamber units which are mounted on a frame; each of array ion-chamber units has its own pressured sealed housing and respectively comprises a plurality of pixel ion-chamber elements; the central axis of each of the array ion-chamber units points to the radiation source, with an opening angle less than 2°; the radiation field defined by the total opening angle of the combined array detectors with respect to the radiation source accommodates the object to be inspected; each of the array ion-chamber units is filled with pressurized gas, with filling pressure high than $1\times10^{6}$ pascals, and lower than $1\times10^{7}$ pascals, and the product Pd of pressure P and length d of the electrode along the traveling direction of the ray is treater than $2.5\times10^{5}$ pascal-m; a set of auxiliary array ion-chamber units is provided in front of the boundary of every two array ion-chamber units to avoid the dead area of detection caused by the case of the array ion-chamber unit.

2. A detecting device as claimed in claim 1, characterized in that each of said array ion-chamber units comprises a pressurized case, a window, an electrode system, pressurized gas and leads of ceramic-to-metal sealed insulators.

3. A detecting device as claimed in claim 1, characterized in that said pressurized case is made of stainless steel or carbonsteel by melting process.

4. A detecting device as claimed in claim 1, characterized in that an elongated window in alignment with the electrode system is provided in the front portion of the case, with the width of the window equal to or slightly greater than the pixel width required, and the mass thickness of the window is 0.1–0.3 $g/cm_2$.

5. A detecting device as claimed in claim 1, characterized in that the electrode system in each array ion-chamber unit comprises high voltage electrodes, collecting electrodes and insulating spacers, with all the electrode plates arranged parallel to the average direction of the rays incident upon this array ion-chamber unit, and the high voltage electrodes and collecting electrodes in each of the array ion-chamber units are perpendicular to the disposition direction of the pixel ion-chamber elements, in that the shapes of all the high voltage electrodes and collecting electrodes are similar, all the electrodes plates appear in a narrow strap the width of which corresponds to the size of an array ion-chamber pixel and its length is d, a plurality of projections are provided on both sides thereof, and either collecting electrodes or high voltage electrodes are formed by interchanging the directions in which they are mounted on the electrode frame.

6. A detecting device as claimed in claim 1, characterized in that the electrode system in each array ion-chamber unit comprises high voltage electrodes, collecting electrodes and insulating spacers, with all the electrode plates arranged parallel to the average direction of the rays incident upon this array ion-chamber unit, and the high voltage electrodes and collecting electrodes in each of the array ion-chamber units are perpendicular to the disposition direction of the pixel ion-chamber elements, and in that the electrode plate of said collecting electrode is fabricated by a layer of insulating material coated with metal on both sides, each of the metal layer and it opposite high voltage electrodes surface form a pixel ion-chamber element.

7. A detecting device as claimed in claim 1, characterized in that the electrode system in each array ion-chamber unit comprises high voltage electrodes, collecting electrodes and insulating spacers, with all the electrode plates arranged parallel to the average direction of the rays incident upon this array ion-chamber unit, and the high voltage electrodes and collecting electrodes in each of the array ion-chamber units are perpendicular to the disposition direction of the pixel ion-chamber elements, in that said support frame is mainly two opposite grounded metallic plates inlaid with strip slots of said insulating spacers, the rectangular projections of the collecting electrodes or the high voltage electrodes are inserted into different slots of insulating spacers, in the support frame, respectively, with all the collecting electrode plates inserted into the same a plurality of slots of strip insulating spacers, and all the high voltage electrode plates inserted into other a plurality of slots of strip insulating spacers, therefore current leakage which occurred in the insulating material between the high voltage electrode and collecting electrode due to the voltage applied on the high voltage electrode directly flow to "ground" via a grounded metallic plates, without entering the signal measurement circuit via the collecting electrodes.

8. A detecting device as claimed in claim 2, characterized in that ceramic-to-metal sealed insulators or artificial jewel-to-metal sealed insulators are welded on the pressurized case as terminals of the electrode leads.

9. A device of gas ionization array detectors for high energy X or A $\gamma$-ray radiography for inspecting large objections, which is constituted by a plurality of ion-chamber units wherein each ion-chamber unit comprises a case, pressurized gas and an electrode system constituted by a plurality of strap electrodes, and the object is inspected by causing the gas to be ionized to generate output signals; the said a plurality ion-chamber units are pressurized gas array ion-chamber units which are mounted on a frame; each of array ion-chamber units has its own pressured sealed housing and respectively comprises a plurality of pixel ion-chamber elements; the central axis of each of the array ion-chamber units points to the radiation source, with an opening angle less than 2°; the radiation field defined by the total opening angle of the combined array detectors with respect to the radiation source accommodates the object to be inspected; each of the array ion-chamber units is filled with pressurized gas, with filling pressure high than $1\times10^6$ pascals, and lower than $1\times10^7$ pascals, and the product Pd of pressure P and length d of the electrode along the traveling direction of the ray is greater than $2.5\times10^5$ pascal-m; wherein the electrode system in each array ion-chamber unit comprises high voltage electrodes, collecting electrodes and insulating spacers, and the electrode system is mounted on a support frame, with all the electrode plates arranged parallel to the average direction of the axis incident upon this array ion-chamber unit, and the high voltage electrodes and collecting electrodes in each of the array ion-chamber units are perpendicular to the deposition direction of the pixel ion-chamber elements, said high voltage electrodes and collecting electrodes are arranged interleaving with each other, and each high voltage electrode surface and collecting electrode form a pixel ion-chamber element.

10. In a gas ionization detector for high energy X-or $\gamma$-ray radiographic inspection of an object, the improvements comprising:

a sealed case;

an electrode support frame within said case;

strap electrode plates on said electrode support frame, said strap electrode plates being spaced in parallel along a length d to define at least one longitudinal axis between each two successive of said strap electrode plates;

a gas between said strap electrode plates at a pressure in a range from $1\times10^6$ to $1\times10^7$ Pascals; and a window in the case, and leads coupled to the strap electrode plates which are one of ceramic-to-metal and artificial jewel-to-metal seal Insulators;

wherein a product Pd of said pressure P and length d is greater than $2.5\times10^5$ Pascal-meters, and said axis is at an angle of incidence not greater than two degrees to said X-or $\gamma$-ray radiation; the window is elongated, aligned with the strap electrode plates, provided in a front portion of the case, the width of the window is not greater than a pixel width required for a display of the radiographic inspection of the object, and the mass thickness of the window is between 0.1 to 0.3 $g/cm_2$.

* * * * *